United States Patent [19]

Goncalves

[11] Patent Number: 5,182,792
[45] Date of Patent: Jan. 26, 1993

[54] PROCESS OF ELECTRIC PIPELINE HEATING UTILIZING HEATING ELEMENTS INSERTED IN PIPELINES

[75] Inventor: Carlos Alberto D. C. Goncalves, Rio de Janeiro, Brazil

[73] Assignee: Petroleo Brasileiro S.A. - Petrobras, Rio de Janeiro, Brazil

[21] Appl. No.: 750,995

[22] Filed: Aug. 28, 1991

[30] Foreign Application Priority Data

Aug. 28, 1990 [BR] Brazil ............................. 9004240[U]

[51] Int. Cl.[5] .......................... F24D 15/02; E21B 7/15
[52] U.S. Cl. ..................................... 392/468; 392/469; 392/301; 392/485; 166/60; 219/523
[58] Field of Search ............... 392/468, 485, 487–489, 392/301, 469, 305; 166/57, 60, 302, 304; 137/13, 341; 219/523; 138/33, 35, 32; 15/257, 104.33; 174/99 R

[56] References Cited

U.S. PATENT DOCUMENTS

| | | | |
|---|---|---|---|
| 2,516,950 | 8/1950 | Bragg | 219/523 |
| 3,629,551 | 12/1971 | Ando | 338/217 |
| 3,678,243 | 7/1972 | Ando et al. | 219/530 |
| 3,975,819 | 8/1976 | Ando | 392/488 |
| 4,002,881 | 1/1977 | West | 219/510 |
| 4,359,627 | 11/1982 | Takeichi | 166/60 |
| 4,423,311 | 12/1983 | Varney, Sr. | 219/208 |
| 4,523,644 | 6/1985 | Dismukes | 166/302 |
| 4,538,682 | 9/1985 | McManus et al. | 166/255 |

FOREIGN PATENT DOCUMENTS

| | | | |
|---|---|---|---|
| 8602278 | 5/1986 | Brazil . | |
| 102497 | 9/1963 | Norway | 392/488 |
| 527759 | 10/1940 | United Kingdom | 392/488 |
| 545349 | 5/1942 | United Kingdom | 392/489 |

Primary Examiner—Bruce A. Reynolds
Assistant Examiner—John A. Jeffery
Attorney, Agent, or Firm—Sughrue, Mion, Zinn, Macpeak & Seas

[57] ABSTRACT

A process to clear pipelines carrying fluids viscous and/or rich in organic residues includes the introduction of a heating element inside a pipeline carrying the fluids through a coupling spool which is intercalated in the fluid-carrying pipeline. Simultaneously an electric current is applied to the heating element so that the heat generated by the heating element is transmitted to the viscous fluid or to the compacted residual mass inside the fluid-carrying pipeline, causing the detachment of those residues from the internal wall of the pipeline and re-establishing the conditions for fluid flow.

4 Claims, 3 Drawing Sheets

4,FERROMAGNETIC MATERIAL   3,FERROMAGNETIC MATERIAL

FERROMAGNETIC MATERIALS

PROCESS OF ELECTRIC PIPELINE HEATING UTILIZING HEATING ELEMENTS INSERTED IN PIPELINES

FIELD OF THE INVENTION

This invention refers to a process to clear pipelines carrying fluids viscous and/or rich in organic residues utilizing heat generation by electric phenomena, whether or not combined with fluid injection and/or steam generation.

The invention refers also to mechanical devices allowing for the introduction of a heating element inside pipelines already installed, for instance, in onshore or offshore petroleum production fields.

BACKGROUND OF THE INVENTION

In the offshore production fields, the flow lines which carry the production from the well to the platform, due toe characteristics of the crude oil and the low temperatures prevailing at the site where same are installed, usually at large depths where the water temperature can reach around 5° C. are subject to severe obstruction problems, due to residues which are found dissolved in that oil—paraffins, asphaltenes, resins, wax, silica, etc.

It has been verified that those residues tend to accumulate in the line, although their formation may have occurred in a rather previous site. Depending upon the fluid flow rate, those residues do not deposit immediately as the water temperature lowers. It is known that fluid flow can occur at temperatures below the so-called pour point, that is, the lowest temperature at which a fluid flow due to its own weight (Standard ASTM-D97). This mean that, if pressure is applied to a fluid at a temperature below its pour point, it will flow.

In practice, however, the application of pressure in the pipelines comes up against severe limitations as regard equipment horsepower and dimensions. As the pipelines become longer, the problem of obstruction grows worse, and may reach some kilometers of extension.

DESCRIPTION OF THE PRIOR ART

It is well-known that obstructions caused by paraffinic residues can be reduced or even eliminated when the fluid which is being transported through the pipeline can be sufficiently heated, making it possible to unglue the residue from the pipeline walls, which makes its displacement easier.

U.S. Pat. No. 4,538,682 describes a method to remove paraffinic residues which deposit in colder regions of the production string of a petroleum well located in a formation cut by a water table. The method consists of running in the well, through the annulus formed between the production string and the casing, down to the level of the region where the deposit occurs, a coil or set of coils involving the obstructed interval of the string. The extremity of the coil is connected, at the surface, to a power supply with the purpose of heating the coil, which transfers heat to the production string and to the fluid inside same.

The major disadvantage of this method is that heat is applied to a given region, not preventing the residues from depositing in other points of the string where a new temperature differential occurs which allows for deposit formation. As a consequence, the coil has to be constantly displaced from one region to another.

Brazilian application PI 8602278, by the same applicant hereof, describes a process for petroleum well deparafinnation in which an electric current is applied to the production string of the well to promote the dissipation of heat to the fluid inside the string and prevent the occurrence of paraffin deposits at the string and at the pumping rod. In this case the fluid is maintained heated along the string, thus preventing new deposits.

When the well is located at the seabottom, these methods described above become difficult to apply, since any intervention directly to the well implies laborious operations, rather time-consuming and of great risk, in addition to being very expensive. It must be recalled that it is the case of heating kilometers of piping located at large depths in the sea.

In addition to those difficulties, in offshore installations the connections between the well and the platform are achieved by means of flexible pipelines, due to the handling facility. These flexible pipelines are formed basically by alternate layers of steel spirals intercalated by layers of an elastomer, usually a polyamide-base one. The internal steel layer is interlocked, whereas the outermost layer is constituted by a crossed shield designed to provide the pipeline with a stronger structural reinforcement.

In view of said structure, those pipelines face a certain limitation as regards their application for transportation of heated fluids.

This invention has the purpose of providing a process to clear pipelines carrying viscous fluids rich in organic residues, particularly pipelines located at the seabottom, upon the application of heat, generated as from electric phenomena, utilizing heating elements, whether or not combined with the use of special fluids.

Another object of this invention is to provide a heating element, to be utilized in the process of the invention.

Another object of this invention is to provide means for the introduction of a heating element in pipelines carrying viscous fluids rich in organic residues, already installed at the seabottom.

These and other objects shall become more evident as the invention is described in more detail.

SUMMARY OF THE INVENTION

The process of heating, which is the object of this invention, includes the introduction of a heating element inside a pipeline carrying viscous fluids rich in organic residues, through a coupling spool which is installed at a given point of said pipeline, so that said heating element crosses the region obstructed by said organic residues, transmitting to them heat sufficient to make release residues from the pipeline walls and reestablishing the conditions required for fluid flow.

The heating element to be utilized in the process consists of a heating tube formed by the set of one or more ferromagnetic conductors electrically isolated, which are involved by an also ferromagnetic external layer, and being the extremities of the set of conductors connected among themselves or to the external layer.

For the introduction of said heating element in the fluid-carrying pipeline, a coupling spool is utilized, especially designed for this process, which includes a cylindrical body provided in its extremities with adaptors, with the purpose of allowing its connection to the fluid-carrying pipeline, and having a lateral opening in which a guide-channel is installed, which guide-channel penetrates partially the cylindrical body of the spool, so as to orient and centralize the penetration of the heating element inside said fluid-carrying pipeline.

With the purpose of making easy the understanding of the invention, we shall hereafter describe it in detail, simultaneously with the figures which are included in this specification.

DETAILED DESCRIPTION OF THE INVENTION

This invention is based on heat generation as from electric phenomena, obtained through the application of an electric current to a conductor.

As an electric current is applied through a conductor, a certain quantity of energy is transformed into heat, which may be represented by the equation $Q=RI^2$, in which Q represents the heat generated, R is the resistance of the material of which the conductor is made, and I is the intensity of the electric current which flows through the conductor.

That phenomenon, based on the resistive effect of the electric current, is known as Joule Effect.

Another way of obtaining heat by means of electric current is based on the inductive effect. If we take a duct formed by an internal conductor coated by an insulating material and by an external carcass of a ferromagnetic material, the circulation of alternating current through the internal conductor of the duct induces a variable magnetic flow in its coating, generating voltages in same, which promotes the circulation of a current in the coating. Said voltage follow Faraday's Law:

$$e = -Nd\phi/et$$

where e represents the electric voltage, $\phi$ is the magnetic flow, and t is the time. The energy originating from said current circulation is dissipated in the form of heat in the coating itself.

Another phenomenon which occurs also is the so-called skin effect, which makes the distribution of the current nonuniform in a cross-section of the electric conductor. This is due to the fact of the electromotive forces induced at the center of the conducting material are larger than the forces developed at the periphery, forcing the electric current which is circulating to migrate towards the periphery of the material. Thus, the effective area for the passage of current becomes smaller, increasing the effective resistance of the circuit, making it possible to generate a larger quantity of heat per unit of circulating current. The thickness of this area is defined so that the value of the circulating current be equal to 1/e of the value of the current at the periphery of the conducting material, and may be calculated by the equation:

$$\delta = 1/[\pi\sigma\mu f]^{\frac{1}{2}}$$

where $\delta$ is the thickness or depth of the skin effect, $\sigma$ represents the conductivity, $\mu$ is the permeability of the conducting material and f is the frequency of the electric current.

It may be observed that, the higher the frequency, the larger the sin effect, due to the reduction in the thickness of the layer through which the electric current will circulate.

This invention is based on the combination of those effects above described to generate heat to the environment, taking advantage of that heat generated for the application to the process of clearing pipelines carrying fluids viscous and/or rich in organic residues, object of this invention.

Figure 1A:
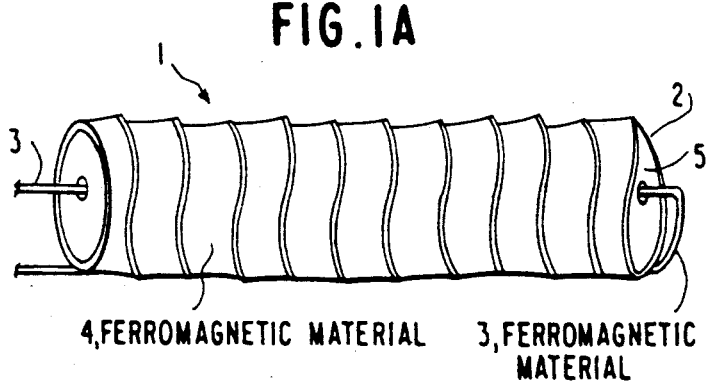
FIG. 1A is a perspective view of a section of the heating element which is one object of this invention.
Figure 1F:
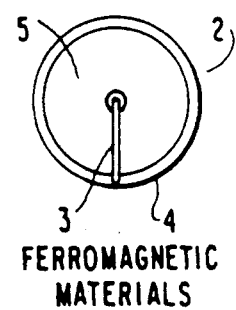
FIG. 1F is an end view of the embodiment of the heating element section illustrated in FIG. 1A.
Figure 1B:
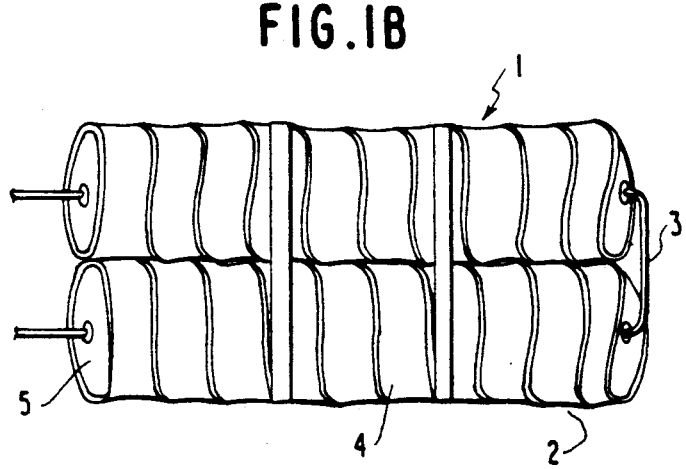
FIG. 1B is a perspective view of a section of an alternative form of heating element.
Figure 1C:
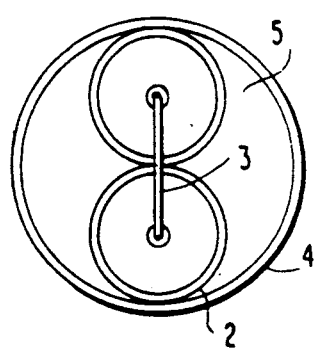
FIG. 1C is an end view of the section of heating element illustrated in FIG. 1B.
Figure 1D:
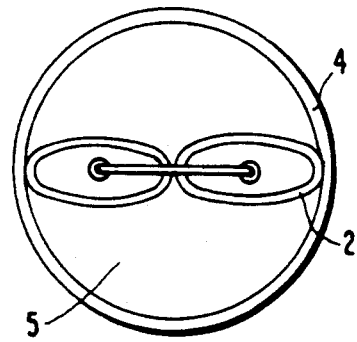
FIG. 1D is an end view of an alternative embodiment of the heating element forming an object of this invention.

As shown in FIG. 1, the heating element (1) utilized in the process of the invention includes a heating tube (2) formed by at least one ferromagnetic conductor (3), selected from the group consisting of iron, steel and alloys thereof, electrically isolated from its external coating (4) by means of ceramic material, TEFLON or any other adequate material (5); said conductor (3) being connected to the external coating (4), as shown on FIG 1A, or, in case where more than one conductor is used, connected among themselves, as shown on FIG. 1B. The external coating (4) is of the corrugated or interlocked type and also made of a ferromagnetic material, which provides it with tensile stress and flexibility, allowing for an easier handling at the time of its introduction in the fluid-carrying pipeline as described later on.

The internal conductors may be combined in several ways and in the amount desired, and may present a circular, elliptical or any other adequate section. FIG. 1 shows some of those possibilities, but does not limit the invention.

Figure 1E:
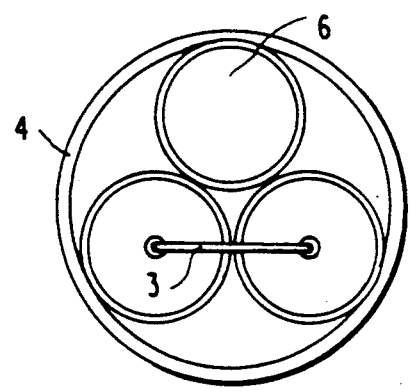
FIG. 1E is an end view of an alternative embodiment of the heating element forming one aspect of this invention.

Another alternative, shown on FIG. 1E, consists of replacing one of the electric conductors by a fluid-carrying pipe (6), which may be utilized for introduction of water or any special fluid as, for instance, solvents, to help dissolving the residue.

The terminal end of the heating element, not shown on the figures, includes a piece which is adjusted to the pipeline extremity, protecting the electric connections and shaped so as to make easy its penetration in the mass of residues stuck inside the pipeline carrying fluids viscous and/or rich in organic residues. In case it is used a version in which the utilization of a solvent-carrying pipe is anticipated, the terminal end shall be provided with one or more orifices allowing for the outlet of the solvent.

It must be pointed out that other possibilities not shown or described herein, but which may be easily inferred by the experts in the subject, shall be covered by the scope of the invention.

Figure 2:
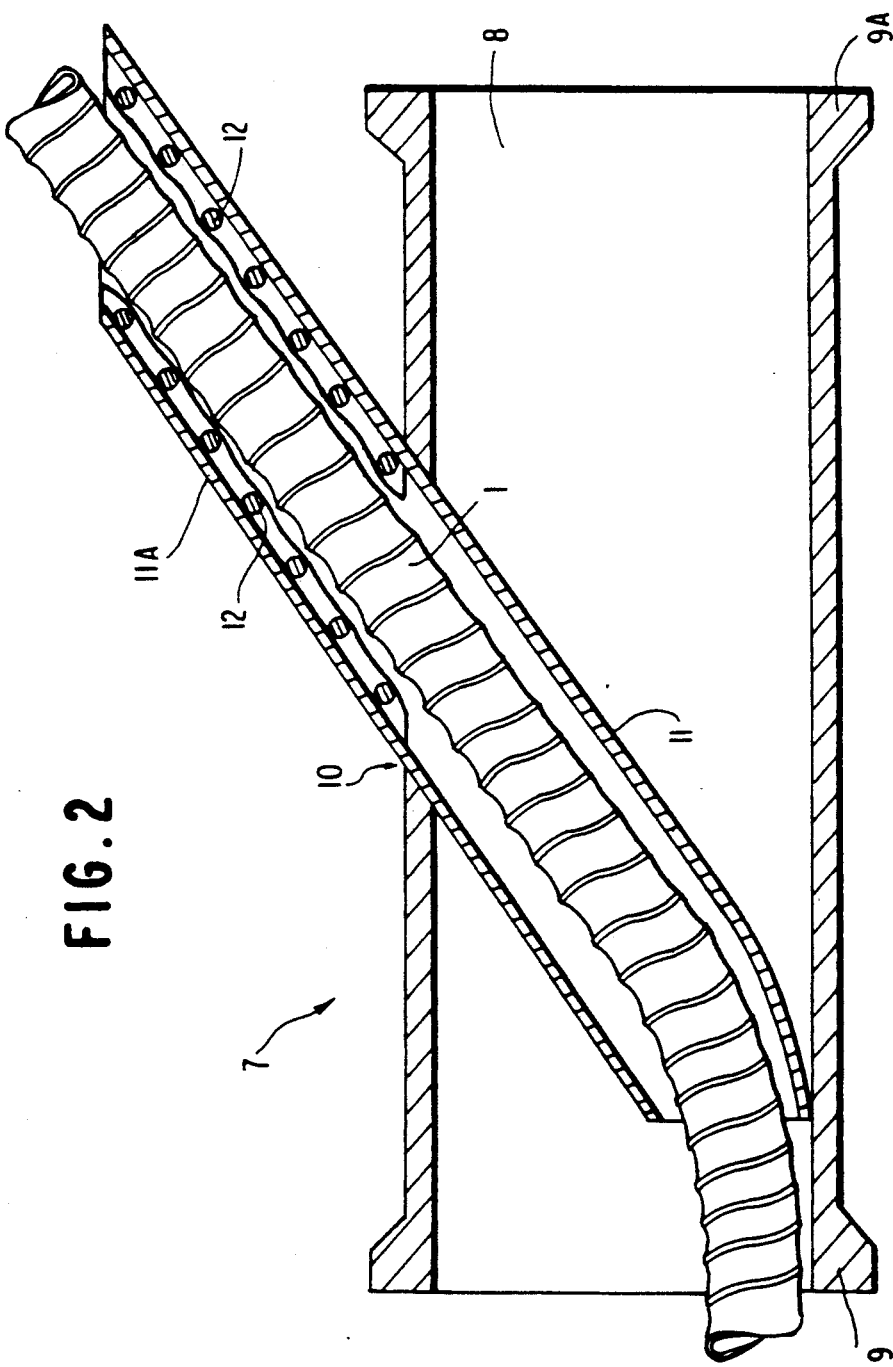
FIG. 2 shows a longitudinal section of the coupling spool for the pipelines and further introduction of the heating element in said pipelines.

FIG. 2 shows, in a longitudinal section, the coupling spool for the pipelines, which constitutes a piece of fundamental importance for the good performance of the process of the invention.

The coupling spool (7) includes a cylindrical body (8) with diameter equal to that of the pipeline to be coupled with it, provided with adaptors (9, 9A) in its extremities for easy connection between the pipelines and with an opening (10) in its lateral wall. Through this lateral opening (10) a guide-channel (11) is introduced, which penetrates inside the cylindrical body of the spool (8) and is attached to said lateral opening (10), fully sealing said opening with the purpose of preventing the fluid from coming out to the environment. The guide-channel (11) allows for the centralized introduction of the heating element (1) inside the obstructed pipeline and its inclination is calculated so as to make possible the slippage of said heating element into the coupling spool (8) and therefrom to the obstructed pipeline, orienting its displacement.

The portion of the channel (11A) which extends outside the cylindrical body of the spool is provided with mechanical means (12), such as bearing and/or gears, which help the slippage operation of the heating element (1) into the pipeline. In this portion (11A), the interior of the channel is provided with means for dynamic sealing, not shown on the figure, to ensure the tightness of the set.

For offshore petroleum production, the choice of the production system takes into consideration parameters such as the number of producing wells, the field size and behavior, the recovery method which shall be utilized, the water depth, etc.

Figure 3:
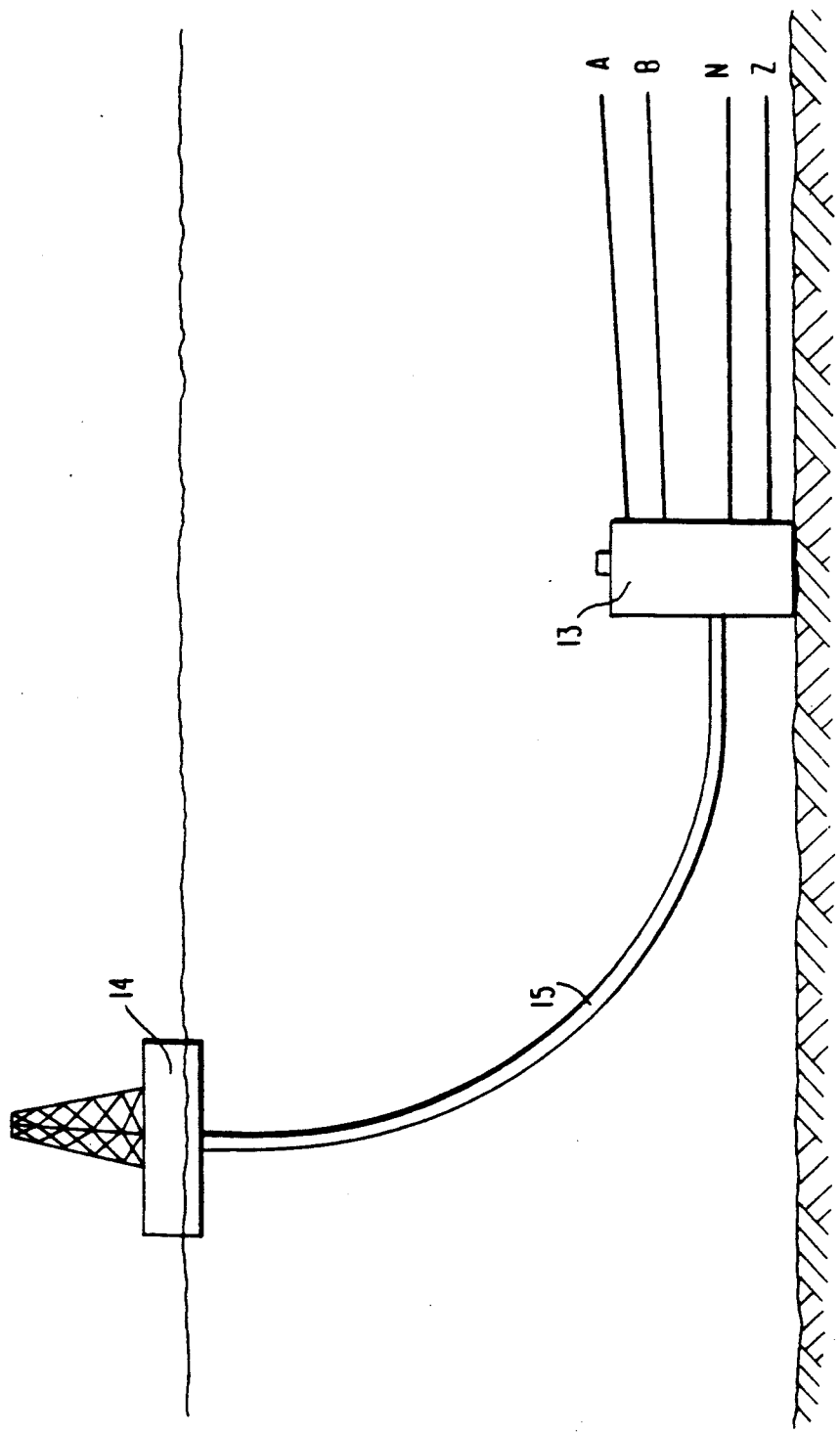
FIG. 3 represents schematically a part of an offshore petroleum production system.

FIG. 3 shows schematically, in a rather simplified way, a production system in which the production from the wells is carried by individual lines (A, B, . . . Z) to a subsea production manifold (13), which is set at the seabottom, and therefrom to the platform (14), through one single line (15) of larger diameter. Alternatively, depending upon the number of producing wells, the individual lines may be directly connected to the platform.

The process of this invention includes the possibility of intercalating one or several coupling spools in the individual lines, or in the single line which is connected to the platform, and through them introducing the heating element inside those lines. As the heat generated by the heating element is transmitted to the fluid inside the fluid-carrying pipeline. The viscosity of said fluid is altered, making easy the penetration and the displacement of the heating element, or heating pipe as described above, into the residual mass contained inside the pipeline.

The process of electric pipeline heating, object of this invention, consists of disconnecting, at predefined points, the fluid-carrying pipelines (15, A, B, . . . Z)—or production lines —which are obstructed, intercalating at these points a pipeline coupling spool (7) provided with a lateral opening (10), introducing through this lateral opening (10) a heating element (1), which is constituted by a heating pipe (2), making same penetrate inside said fluid-carrying pipelines and displace through same, applying to said heating element (1), simultaneously to its introduction in said coupling spool (7), an electric current originating from a generation source located at the surface, so that the heat generated by said heating element (1) be transmitted to the viscous fluid or to the compacted residual mass inside the carrying pipelines and modify its physical characteristics until at least the residual mass detaches itself from the inner surface of the carrying pipeline and restablishes the conditions for fluid flow. Once the flow is restablished, the temperature of the fluid may be controlled by periodically disconnecting the passage of electric current.

The shape of the terminal end of the heating pipe contributes significantly towards the penetration of the heating pipe into the residual mass, at the beginning of the process, when the temperature differential is still large and the residual mass is consolidated.

One advantage of the process of the invention is that the heating element maintains the fluid heated in the whole extension already traversed of the carrying pipeline, preventing same from solidifying after its passage, ensuring thus the conditions for flow regularization in the carrying pipeline.

Another advantage of the process is that the fluid temperature may be controlled, so as not to affect the material of the fluid-carrying pipeline, which, as mentioned previously, consists of a flexible pipe, the structure of which may be damaged by excess temperature.

Still another advantage is that the heating element, since it has the shape of a pipe, may be manufactured in standard segments, which, according to the particulars of the situation, may be coupled among themselves until the required length is reached. Therefore, no additional expenses are required for its handling, since the conventional equipment utilized in the branch and usually available at the operation site may be used.

In case the extension of the carrying pipeline to be cleared is too large, as from a predefined point, it is possible to introduce at least two of those heating elements in opposite directions, it being sufficient for that to utilize two coupling spools with the guide-channels oriented towards opposite directions.

Depending upon the nature of the compacted residual mass in the pipeline, it may be required to use special fluids, as steam or solvents, to make easy the penetration of the heating element or even dissolve the residual mass. In those cases the alternative shown on FIG. 1E may be utilized, which includes a fluid-carrying pipe (6) which makes possible to inject said special fluids directly at the desired point.

In case water injection is utilized, the temperature developed by the heating pipe (2) may be sufficient to generate steam, which on its turn may be used as an agent to make easy the penetration of the pipe into the residual mass and also to carry the residues already disaggregated.

A preliminary laboratory test, in conditions of natural air convection and ambient temperature of 22° C., showed that it is possible to obtain temperatures around 54° C. in the external coating of the heating pipe, by applying a 40 A, 60-Hz electric current to a heating pipe formed by an internal iron conductor with 0.47 cm (3/16") of diameter, with internal ceramic isolators and corrugated external coating with 2.54 cm (1") of diameter, for nearly 60 minutes.

It becomes clear to the experts in the subject that this process applies as well to onshore pipelines, as oil pipelines for instance, or even to onshore wells.

In case of new installations of production systems in regions where the fluid is known to present the characteristics described previously, the heating element may be previously installed, at the time of installation of said new system.

I claim:

1. Process of electric heating of pipelines carrying fluids viscous and/or rich in organic residues, comprising:

disconnecting, at pre-defined points, the fluid-carrying pipelines (15, A, B, ... Z) which are obstructed, intercalating in said points a pipeline coupling spool (7) provided with a lateral opening (10), introducing through said lateral opening (10) a heating element (1), causing said heating element (1) to penetrate into said fluid-carrying pipelines and to be displaced through the same, applying to said heating element (1), simultaneously with its introduction into said coupling spool (7), an electric current from a generating source located at the surface of the source such that the heat generated by said heating element (1) is transmitted to the viscous fluid inside said fluid-carrying pipeline and modifies the pipeline physical characteristics until at least the residual mass detaches from an internal surface of said fluid-carrying pipeline and re-establishes conditions for fluid flow, and wherein said coupling spool (7) includes a cylindrical body (8) with a diameter equal to that of the pipeline carrying said fluids viscous and/or rich in organic residues, provided with adaptors (9, 9A) in its extremities for connection between pipelines and having said opening (10) in a lateral wall thereof, said coupling spool further comprising:

a guide-channel (11) which penetrates inside said cylindrical body (8) and attached to said lateral opening (10), fully sealing said lateral opening and extending partially outside said cylindrical body (8); and said method further comprises:

dynamically sealing a portion (11A) of the guide-channel (11) which extends outwards and orienting, centralizing and introducing said heating element (1) inside the fluid-carrying pipeline via bearings interposed between the guide channel (11) and said heating element (1).

2. Process of electric pipeline heating, according to claim 1, further comprising:

passing intermittently said electric current through the heating element thereby controlling the fluid temperature inside the fluid-carrying pipeline.

3. Process of electric pipeline heating, according to claim 1, wherein said heating element (1) includes a heating pipe (2) formed by at least one ferromagnetic conductor (3), electrically isolated from an external coating (4), also made of a ferromagnetic material, and said process comprises connecting extremities of said internal conductors (3) among themselves or to the external coating (4).

4. Process of electric pipeline heating, according to claim 1, wherein said heating element (1) has a pipe and said process further comprises supplying fluids (6) to said heating element heating pipe.

* * * * *